US006705349B2

(12) United States Patent
Themudo et al.

(10) Patent No.: US 6,705,349 B2
(45) Date of Patent: Mar. 16, 2004

(54) WEEP PLUG

(75) Inventors: Ramon Themudo, Cincinnati, OH (US); Gary Paul Moscarino, Cincinnati, OH (US); Martin Richard Brown, Melbourne Beach, FL (US); Duane Howard Anstead, Hamilton, OH (US); Kenneth Lee Fischer, Lockland, OH (US); Christopher Lee Snow, Cincinnati, OH (US)

(73) Assignee: General Electric Company, Schenectady, NY (US)

( * ) Notice: Subject to any disclaimer, the term of this patent is extended or adjusted under 35 U.S.C. 154(b) by 56 days.

(21) Appl. No.: 10/086,149

(22) Filed: Oct. 22, 2001

(65) Prior Publication Data

US 2003/0168117 A1 Sep. 11, 2003

(51) Int. Cl.[7] .................................................. F16L 55/10
(52) U.S. Cl. ............................................ 138/89; 138/90
(58) Field of Search ........................... 138/89, 90, 96 T, 138/96 R; 137/583, 587; 220/366.1, 374

(56) References Cited

U.S. PATENT DOCUMENTS

| | | | | | |
|---|---|---|---|---|---|
| 3,454,182 | A | * | 7/1969 | Morton | 220/374 |
| 4,231,544 | A | * | 11/1980 | Balch | 251/144 |
| 4,986,502 | A | * | 1/1991 | Ceroke | 251/216 |
| 5,024,345 | A | * | 6/1991 | Deweerdt | 220/366.1 |
| 5,201,845 | A | | 4/1993 | Allmon et al. | 415/169.1 |
| 5,325,977 | A | * | 7/1994 | Haynes et al. | 215/307 |
| 5,338,153 | A | * | 8/1994 | Swanson et al. | 415/168.2 |
| 5,464,469 | A | * | 11/1995 | Close et al. | 96/220 |
| 5,490,762 | A | * | 2/1996 | Feucht et al. | 415/168.1 |
| 5,747,904 | A | | 5/1998 | Sudhoff et al. | 310/88 |
| 5,975,157 | A | | 11/1999 | Ashford | 141/98 |
| 6,513,550 | B1 | * | 2/2003 | Kwilosz | 138/96 R |
| 2001/0025647 | A1 | * | 10/2001 | Chen et al. | 135/15.1 |

* cited by examiner

*Primary Examiner*—Patrick Brinson
(74) *Attorney, Agent, or Firm*—Nathan D. Herkamp; Pierce Atwood

(57) ABSTRACT

The present invention provides a weep plug for an oil sump having a central vent passage and one or more weep passages parallel to the central passage. The weep passages allow oil to flow back into the sump where it may be recovered.

19 Claims, 6 Drawing Sheets

WEEP PLUG

BACKGROUND OF THE INVENTION

This invention relates generally to gas turbine engines and more particularly to a weep plug for recovering oil used to lubricate the bearings of a gas turbine engine.

Gas turbine engines typically include a core having a compressor for compressing air entering the core, a combustor where fuel is mixed with the compressed air and then burned to create a high energy gas stream, and a pressure turbine which extracts energy from the gas stream to drive the compressor. In aircraft turbofan engines, a low pressure turbine located downstream from the core extracts more energy from the gas stream for driving a fan. The fan provides the main propulsive thrust generated by the engine.

Bearings are used in the engine to accurately locate and rotatably mount rotors with respect to stators in the compressor and high and low pressure turbines of the engine. The bearings are enclosed in oil-wetted portions of the engine called sumps.

In order to prevent overheating of the bearings, lubricating oil and seals must be provided to prevent the hot air in the engine flowpath from reaching the bearing sumps, and lubricating oil flows must be sufficient to carry away heat generated internally by the bearings because of their high relative speed of rotation.

Oil consumption arises from the method used to seal the engine sumps. The sealing method makes it necessary for an air flow circuit to exist that flows into and out of the sumps. This flow ultimately contains oil that is unrecoverable unless adequately separated and delivered back to the sumps. In one particular configuration the forward engine sump is vented through the forward fan shaft and out the engine through a center vent tube. Once the air/oil mixture exits the sump, it swirls, depositing oil on the inside of the fan shaft. Oil that is contained in the air/oil mixture is lost when it is unable to centrifuge back into the sump through the vent hole due to rapidly escaping vent air.

Some designs allow for oil recovery by using weep holes, which are passages whose function is to provide a dedicated path for oil to re-enter the sump, integrated into the forward fan shaft design. Weep holes are typically smaller in diameter and longer in length than holes designed to route vent flow. However, in other designs, the fan shaft has no dedicated weep holes, only vent holes. Forming weep holes in fan shafts of the latter design after their manufacture and installation in an engine would be prohibitively expensive.

Accordingly, there is a need for a method to recover oil in existing sump structures without modifying the existing hardware.

BRIEF SUMMARY OF THE INVENTION

The above-mentioned need is met by the present invention, which provides a weep plug having a central vent passage and one or more weep passages parallel to the central passage.

The present invention and its advantages over the prior art will become apparent upon reading the following detailed description and the appended claims with reference to the accompanying drawings.

BRIEF DESCRIPTION OF THE DRAWINGS

The subject matter that is regarded as the invention is particularly pointed out and distinctly claimed in the concluding part of the specification. The invention, however, may be best understood by reference to the following description taken in conjunction with the accompanying drawing figures in which:

DETAILED DESCRIPTION OF THE INVENTION

Figure 1:
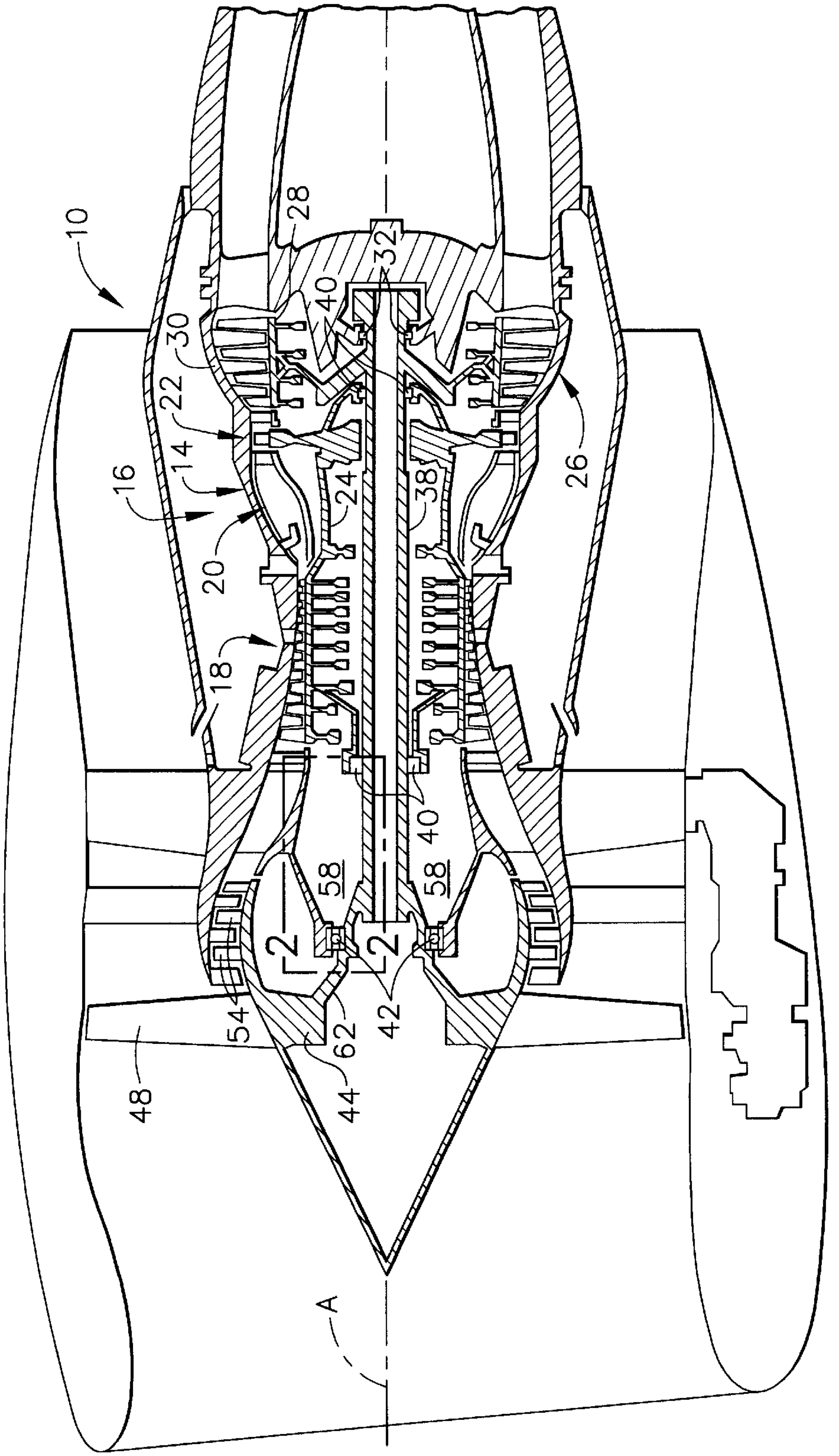
FIG. 1 is a longitudinal axial sectional view of a gas turbine engine incorporating a weep plug of the present invention.

Referring to the drawings wherein identical reference numerals denote the same elements throughout the various views, FIG. 1 illustrates a gas turbine engine, generally designated 10, in which is incorporated weep plug 90 of the present invention, as shown in detail in FIGS. 3–8. The engine 10 has a longitudinal center line or axis A and an outer stationary annular casing 14 disposed concentrically about and coaxially along the axis A. The engine 10 includes a gas generator core 16 which is composed of a multistage compressor 18, a combustor 20, and a high pressure turbine 22, either single or multiple stage, all arranged coaxially about the longitudinal axis or center line A of the engine 10 in a serial, axial flow relationship. An annular outer drive shaft 24 fixedly interconnects the compressor 18 and high pressure turbine 22.

The core 16 is effective for generating combustion gases. Pressurized air from the compressor 18 is mixed with fuel in the combustor 20 and ignited, thereby generating combustion gases. Some work is extracted from these gases by the high pressure turbine 22 which drives the compressor 18. The remainder of the combustion gases are discharged from the core 16 into a low pressure turbine 26.

An inner drive shaft 38 is mounted for rotation relative to the outer drive shaft 24 via rear bearings 32, differential bearings 40, and via suitable forward bearings 42 interconnected to the outer stationary casing 14. The inner drive shaft 38, in turn, rotatably drives a forward fan shaft 62, which in turn drives a forward fan disk/booster rotor 44. Fan blades 48 and booster blades 54 are mounted to the fan disk/booster rotor 44 for rotation therewith.

Figure 2:
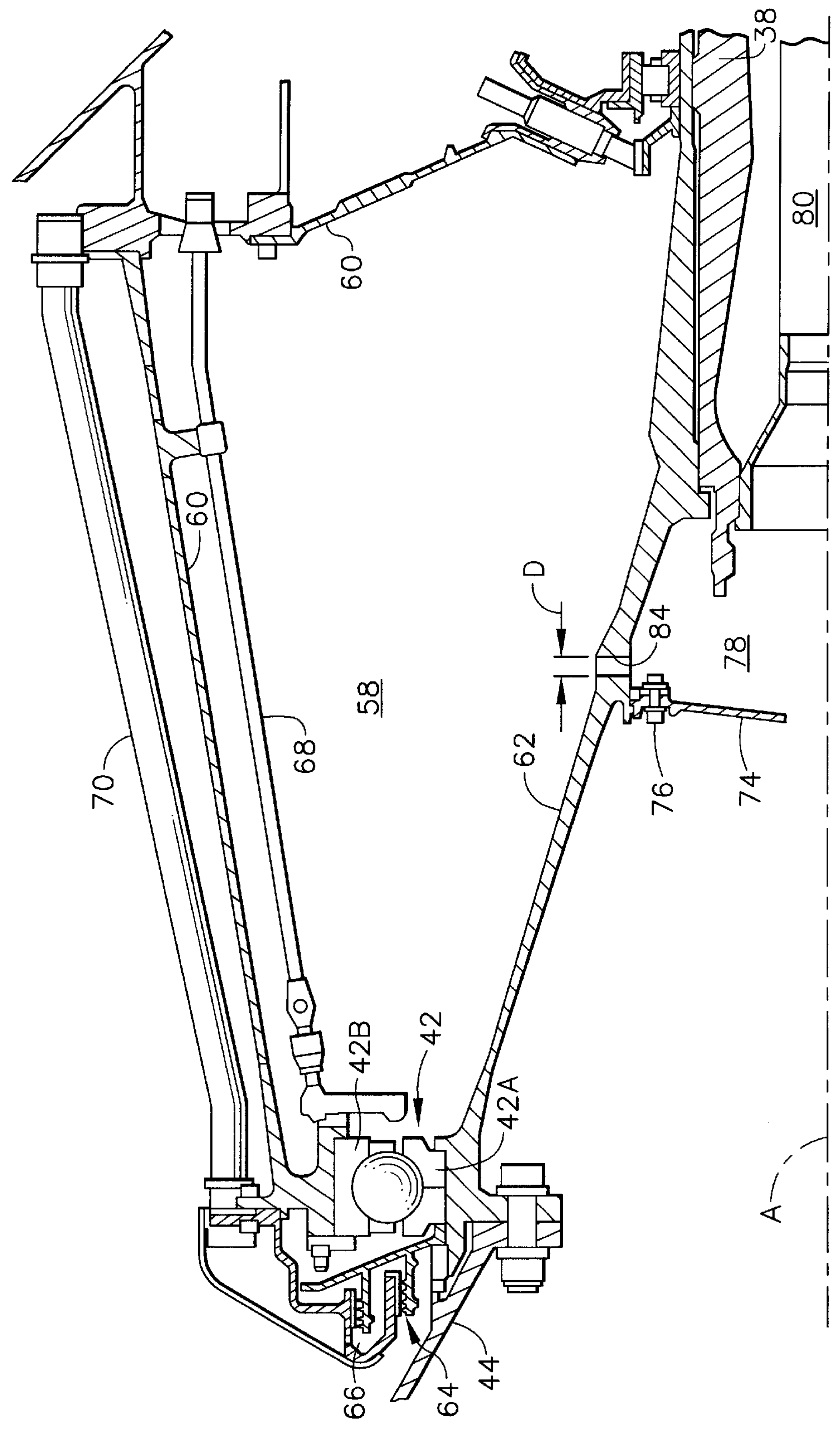
FIG. 2 is an enlarged fragmentary view of a region of the engine enclosed by dashed box 2—2 of FIG. 1.
Figure 3:
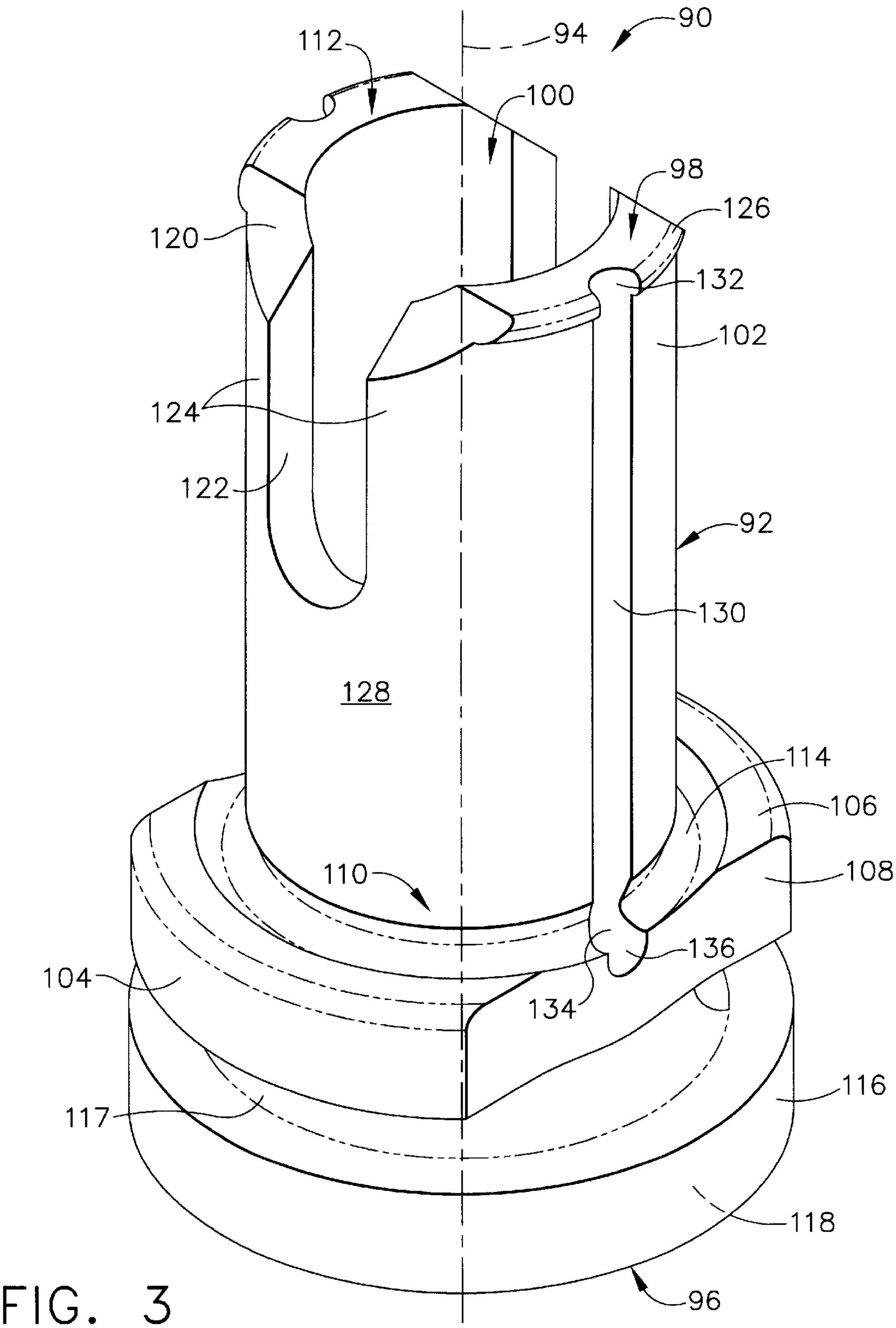
FIG. 3 is a perspective view of a weep plug of the present invention.

Referring now to FIG. 2, there is illustrated the region of the gas turbine engine 10 where a conventional bearing sump 58 is defined about the forward bearings 42. The bearing sump 58 is generally defined by an outer annular structure 60 which is interconnected to the outer casing 14 and the forward fan shaft 62 which rigidly interconnects the forward end of the inner drive shaft 38 to the forward fan disk/booster rotor 44. The forward fan shaft 62, being connected with an inner annular race 42A of the forward bearings, 42 rotates with the inner drive shaft 38 relative to the stationary outer annular structure 60 of the bearing sump 58 which is connected to an outer annular race 42B of the forward bearings 42.

Conventional labyrinth air and oil seals 64, 66 are provided adjacent to the forward bearings 42 and between the forward ends of the relatively rotating outer annular structure 60 and the forward fan shaft 62 to seal the forward end of the bearing sump 58. Oil is pumped to the forward bearings 42 and therefore into the sump 58 through an oil supply conduit 68. Pressurized air is injected to the labyrinth air seal 64 through an air supply conduit 70 in order to prevent oil from leaking through the labyrinth oil seal 66.

A portion of the injected pressurized air which enters the bearing sump 58 must be vented from the sump 58 in a controlled manner in order to maintain sump pressure at a proper balance. However, the pressurized air becomes mixed with particles of the oil in the sump 58. Therefore, the forward fan shaft 62 has one or more vent holes 84 extending through its thickness in a generally radial direction. Typically, the fan shaft 62 has a plurality of these holes 84 arranged in a band around its circumference. The vent holes 84 provide a passage for air flow from the sump 58 into a vent plenum 78 and subsequently into the center vent tube 80. A cover 74 is attached to the forward fan shaft 62 with fasteners 76.

Referring now to FIGS. 3–6, a weep plug 90 has a unitary body 92 having a first end 96 and a second end 98, defining an axis 94 extending therebetween. A generally cylindrical central passage 100 passes axially through the body 92 from the first end 96 to the second end 98. A generally circular head 116 having a flat end surface 118 is disposed at the first end 96. Adjacent the head 116 is a generally annular flange 104 which has a pair of opposed flats 108 formed on laterally opposite sides thereof. An annular groove 117 separates the circular head 116 and the flange 104 and provides a surface for a tool to pry against when removing the plug 90. A generally cylindrical elongated portion 102 extends between a proximate end 110 adjacent the flange 104 and a distal end 112 at the second end 98 of the body 92. An annular groove 114 disposed at the junction of the elongated portion 102 and the flange 104. A rim 106 is disposed on the flange 104 and extends axially towards the second end 98 of the body 92. The rim 106 is divided into two annular sections by the presence of the opposed flats 108 of the flange 104. The flats 108 provide a clearance space between the weep plug 90 and other nearby structures when the weep plug 90 is installed.

Figure 4:
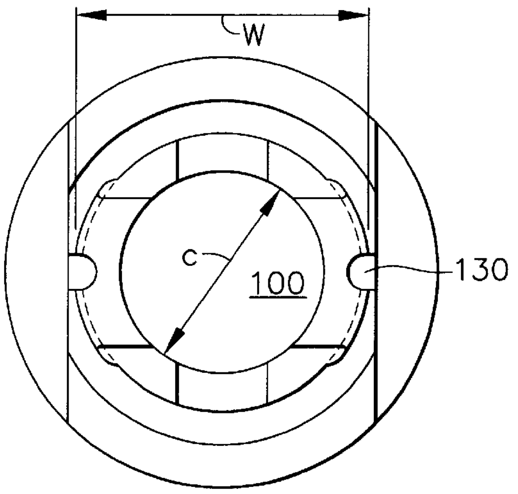
FIG. 4 is an end view of a weep plug of the present invention.
Figure 5:
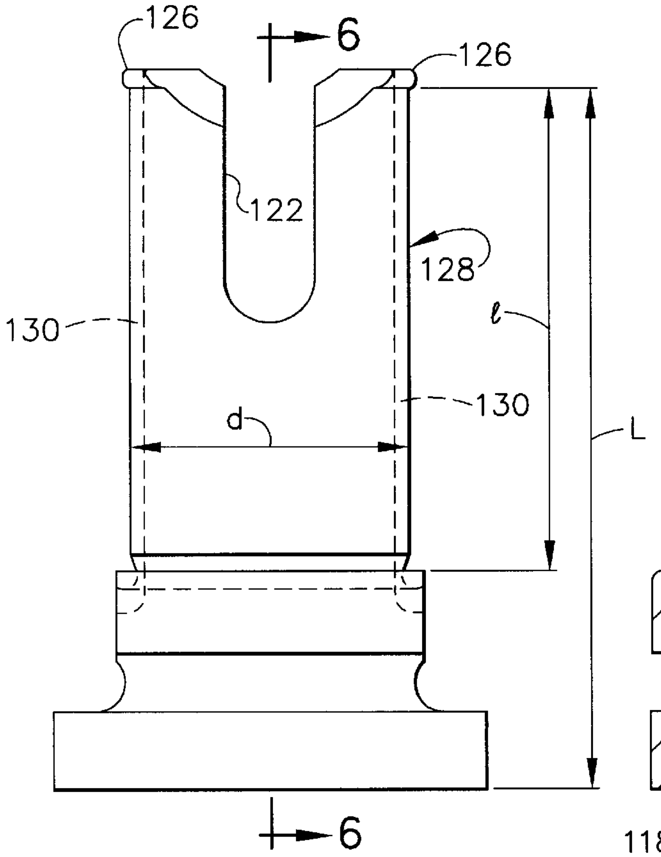
FIG. 5 is a side elevational view of the weep plug of FIG. 4.
Figure 6:
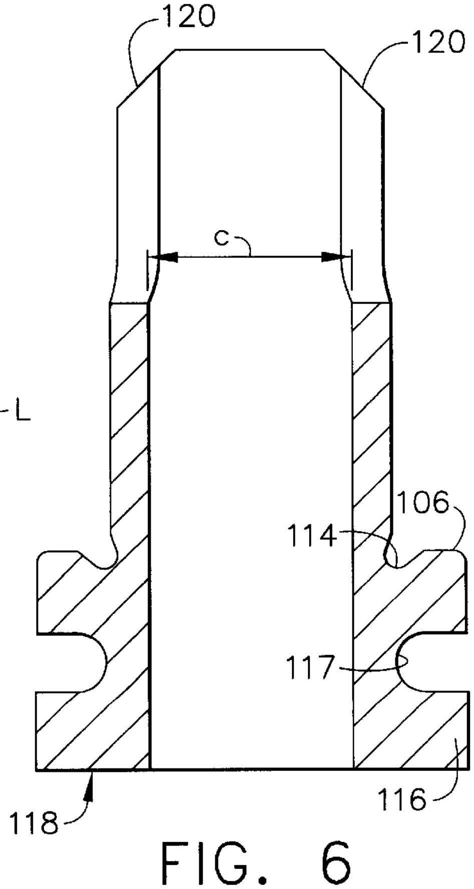
FIG. 6 is a cross-sectional view taken along lines 6—6 of FIG. 5.

A pair of slots 122 are formed in opposite sides of the elongated portion 102. The slots 122 begin at the distal end 112 of the elongated portion 102 and extend partially down the length of the elongated section 94. The slots 122 divide the elongated portion 102 into two prongs 124. Each of the prongs 124 has a pair of chamfered surfaces 120 formed at its distal end 112, on opposite sides of the prong 124. An annular protruding lip 126 extends from the distal end 112 of each of the prongs 108. Although the illustrated example shows two slots 122, it should be noted that three or more slots 122 could be formed in the elongated portion 102, dividing it into three or more prongs 108. At least one weep passage 130 is formed in the outer surface 128 of the elongated portion 102. As best seen in FIGS. 4 and 5, in the illustrated example the weep passages 130 are in the form of grooves having a generally semicircular cross-section, although other shapes may be used. The weep passages have an outlet 132 disposed at the distal end of the elongated portion 102. The weep passages then extend axially towards the flange 104. At the point where the weep passages 130 intersect the annular groove 114, they turn at a corner 134 and then extend radially outward, terminating at an inlet 136 disposed in the flange 104, in alignment with the flat 108.

The weep plug 90 is manufactured from a material which is capable of withstanding the temperatures prevailing in the sump 58, which is approximately 149° C. (300° F.), and resisting attack from the engine lubricating oil. Also, because the fan shaft 62 is a life-limited part whose characteristics must not be compromised, the plug 90 must be made of a material which will itself wear rather than cause wear of the fan shaft 62. Furthermore, the weight of the plug 90 is preferably minimized both to avoid extra weight in the engine 10 generally, and to preclude imbalance problems in the fan shaft 62, especially if the plugs 90 should be improperly installed. One suitable material is VESPEL polyimide, available from E.I. DuPont de Nemours and Company, Wilmington, Del. 19898 USA. Another suitable material is PEEK polyetheretherketone, which is available from Victrex USA Inc., 3 Caledon Court, Suite A, Greenville, S.C. 29615 USA. In general, any material that satisfies the requirements described above may be used, for example aluminum or other relatively soft metals may also be suitable materials. The weep plug 90 may be formed by any known method, for example injection molding, compression molding a near-net shape followed by machining, or by machining from a blank of material.

Figure 7:
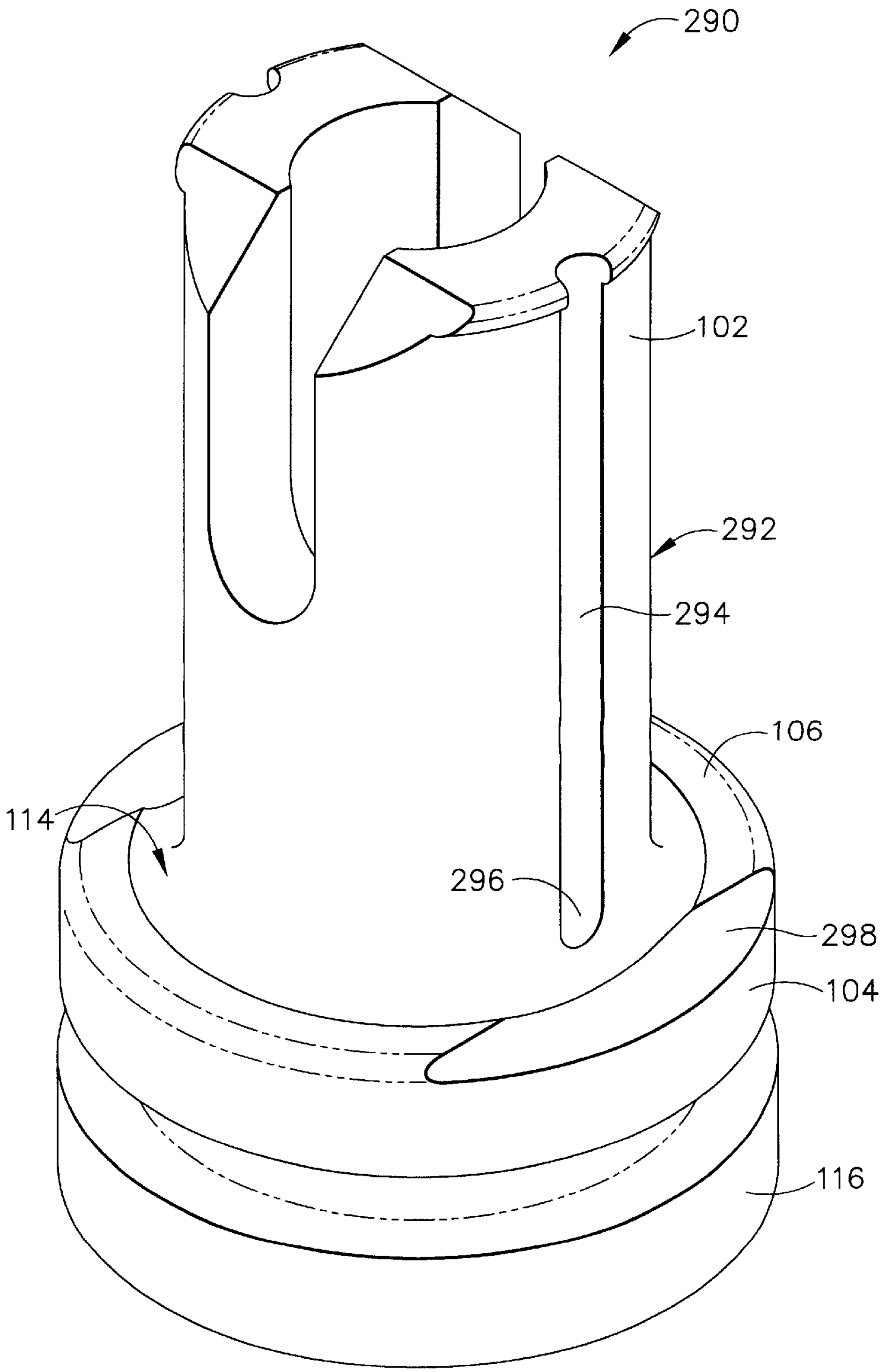
FIG. 7 is a perspective view of a weep plug constructed in accordance with an alternate embodiment of the present invention.

Another embodiment of the present invention is illustrated in FIG. 7. A weep plug 290 is similar to weep plug 90, having a body 292 comprising an elongated portion 102, a flange 104 having a rim 106, and a circular head 116. An annular groove 114 encircles the body 292 at the junction of the flange 104 and the elongated portion 102. A pair of weep passages 294 are disposed in the outer surface of elongated portion 102 on opposite sides thereof. In this embodiment, the inlets 296 of the weep passages 294 do not extend into the flange 104. The flange 104 extends completely around the circumference of the body 292. A pair of opposed channels 298 are formed in the rim 106. The channels 298 are recessed from the surface of the rim 106 and provide additional area for oil to flow to the groove 114 and the weep passages 294.

Figure 8:
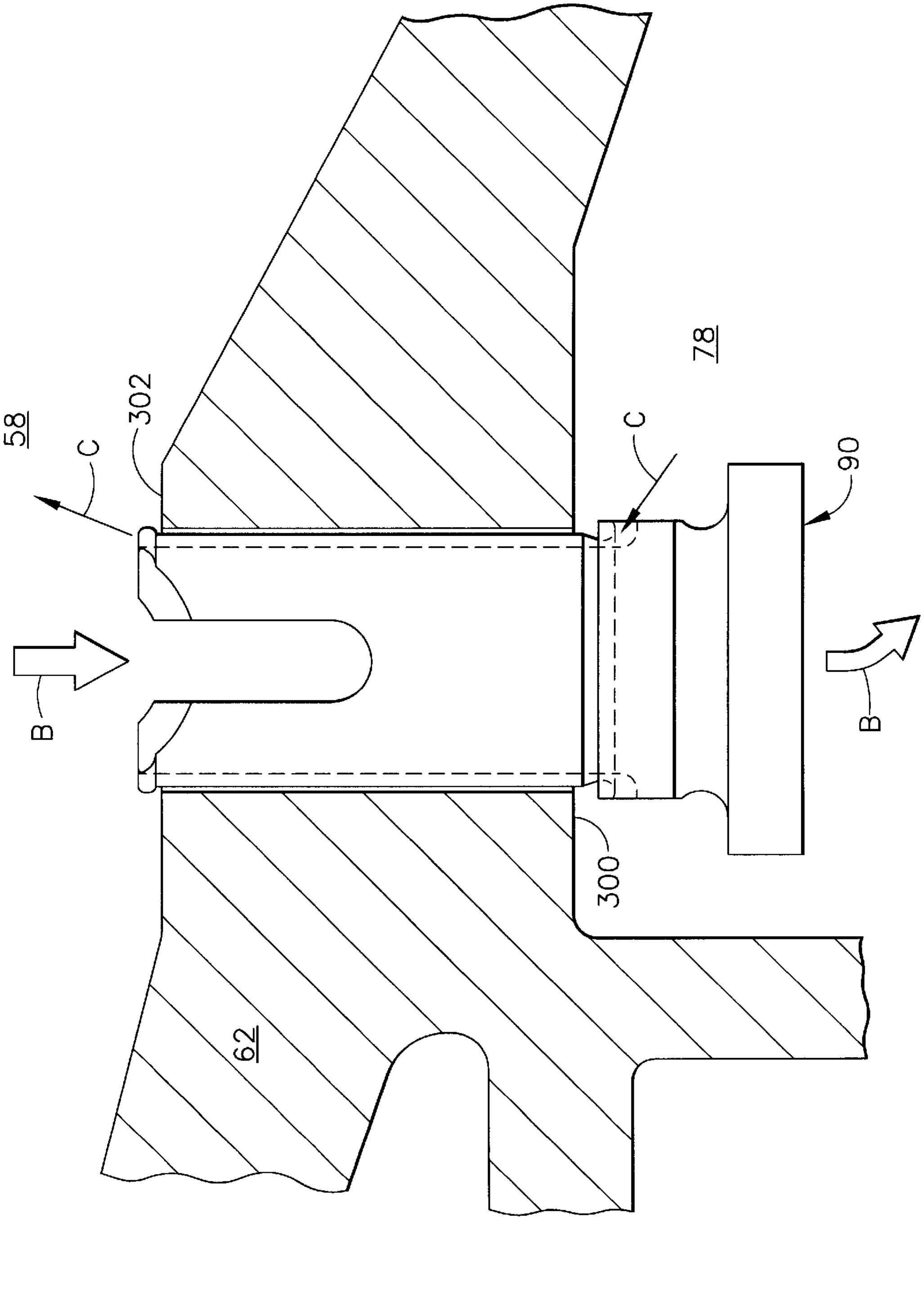
FIG. 8 is a cross-sectional view of a portion of a gas turbine engine fan forward shaft having a weep plug of the present invention installed therein.

FIG. 8 illustrates a more detailed view of the weep plug 90 installed in the forward fan shaft 62. The weep plug 90 is installed in the vent hole 84 from the radially inner direction. The chamfered surfaces 120 assist in aligning the body 92 of the weep plug 90 with the vent hole 84. In the uninstalled condition the width W (FIG. 4) across the outer edges of the lips 126 is slightly greater than the diameter D (FIG. 2) of the vent hole 84. The presence of the slots 122 allows the prongs 124 to flex inward slightly as the weep plug 90 is installed. When the weep plug 90 is fully inserted and the lips 126 clear the radially outward edge of the vent hole 84, the prongs return to their original position and bear against the radially outer edge 302 of the vent hole 84, retaining the weep plug 90 in the vent hole 84. In operation, the weep plug 90 rotates with the forward fan shaft 62 and tends to move radially outward. This causes the rim 106 of the flange 104 to bear against the radially inner edge 300 of the vent hole 84 and retain the weep plug 90 in the vent passage.

In operation, an air/oil mixture exits the sump 58 through the central passage 100 of the weep plug 90, as shown by the arrows marked B in FIG. 8. In the illustrated example the length L of the weep plug 90 is about 30.5 mm (1.2 in.) and the diameter c of the central passage is about 8.8 mm (0.35 in.), resulting in a length-to-diameter ratio of about 3.5. The mixture then swirls, depositing oil on the inside of the forward fan shaft 62. Oil that is contained in the air/oil mixture flows into the inlets 136 of the weep passages 130, along the length of the weep passages 130, and then through the outlets 132 into the sump 58 where it can be recovered, as shown by arrows C. In the illustrated example the weep passages 130 have a length I of about 21 mm (0.83 in.) and a width W of about 0.76 mm (0.03 in.), resulting in a length-to-diameter ratio of about 28. This greater LID ratio allows the oil to flow up the weep passages 130 without being affected by the flow of air sump 58, as it would be without the weep plug 90. Additionally, the diameter d of the elongated portion 102 of the weep plug 90 may be selected relative to the diameter D of the vent hole 84 to leave a clearance between the vent hole 84 and the plug body 92, creating an additional annulus for oil to centrifuge through without being sheared by escaping vent air. The diametrical clearance of the illustrated example is about 0.177 mm (0.007 in.).

The weep plug 90 as disclosed herein provides a tangible oil consumption benefit and is yet simple to implement. The weep plugs 90 can be assembled on field engines while they are still mounted on the aircraft with very little disassembly of the engine. In one particular example, the assembly of four plugs into the forward fan shaft in a total of 22 holes resulted in about an 8% reduction in overall engine oil consumption. The optimum number of plugs 90 will vary for each particular application. If there are too few plugs, the benefit of reduced oil consumption will not be realized. If too many plugs are used they may excessively restrict the flow through vent holes 84, upsetting the sump pressurization balance. Analysis of another possible configuration has shown that 12 plugs used in a possible of 20 holes would result in the optimum reduction in oil consumption while minimally affecting engine system pressurization characteristics. It might also be desirable to use a reduced number of plugs, for example 10, or the equivalent of one plug every other hole, to provide simplified installation.

The foregoing has described a weep plug having a central vent passage and one or more weep passages. While specific embodiments of the present invention have been described, it will be apparent to those skilled in the art that various modifications thereto can be made without departing from the spirit and scope of the invention as defined in the appended claims.

What is claimed is:

1. A weep plug comprising:

a generally cylindrical body having first and second ends, a longitudinal axis, and a wall, said wall having inner and outer surfaces, said inner surface defining a central passage;

a flange disposed adjacent said first end; and at least one generally axial weep passage disposed in said outer surface of said wall, said weep passage extending from said flange to said second end.

2. The weep plug of claim 1 further comprising at least one generally annular lip extending radially outwardly from said outer surface of said wall at said second end thereof.

3. The weep plug of claim 2 further comprising at least two generally axial slots disposed in said wall at said second end of said weep plug, said slots dividing a portion of said wall into at least two axially extending prongs.

4. The weep plug of claim 3 wherein each of said prongs has a pair of chamfered surfaces formed on opposite sides thereof at said second end.

5. The weep plug of claim 2 further comprising a generally circular head formed at said first end of said weep plug, said generally circular head separated from said flange by a generally annular groove.

6. The weep plug of claim 2 wherein said weep plug comprises a polymer.

7. The weep plug of claim 2 wherein said flange comprises a generally annular rim facing said second end of said weep plug and further comprising a pair of recesses formed in said rim so as to define opposed channels, said channels extending generally perpendicularly to said longitudinal axis.

8. The weep plug of claim 2 wherein said flange has recesses formed therein so as to define a pair of flats disposed on opposite sides of said flange, said flats extending generally parallel to said longitudinal axis.

9. The weep plug of claim 1 wherein said central passage has a first length-to-diameter ratio, and said weep passage has a second length-to-diameter ratio, wherein said second length-to-diameter ratio is greater than said first length-to-diameter ratio.

10. A weep plug for use in a gas turbine engine, said weep plug comprising:

a generally cylindrical body having a longitudinal axis and a wall, said wall defining a central flow passage; and at least one weep passage disposed in said wall, said weep passage extending lengthwise in a direction generally parallel to said axis.

11. The weep plug of claim 10 further comprising a generally annular flange disposed at a first end thereof.

12. The weep plug of claim 11 further comprising at least one generally annular lip extending radially outwardly from said outer surface of said wall at a second end thereof.

13. The weep plug of claim 12 further comprising at least two generally axial slots disposed in said wall at said second end of said weep plug, said slots dividing a portion of said wall into at least two axially extending prongs.

14. The weep plug of claim 13 wherein each of said prongs has a pair of chamfered surfaces formed on opposite sides thereof at said second end.

15. The weep plug of claim 12 further comprising a generally circular head formed at said first end of said weep plug, said generally circular head separated from said flange by a generally annular groove.

16. The weep plug of claim 12 wherein said weep plug comprises a polymer.

17. The weep plug of claim 12 wherein said flange comprises a generally annular rim facing said second end of said weep plug and further comprising a pair of recesses formed in said rim so as to define opposed channels, said channels extending generally perpendicularly to said longitudinal axis.

18. The weep plug of claim 12 wherein said flange comprises a generally annular rim facing said second end of said weep plug and further comprising a pair of recesses formed in said rim so as to define opposed channels, said channels extending generally perpendicularly to said longitudinal axis.

19. The weep plug of claim 10 wherein said central passage has a first length-to-diameter ratio, and said weep passage has a second length-to-diameter ratio, wherein said second length-to-diameter ratio is greater than said first length-to-diameter ratio.

* * * * *